United States Patent [19]
Derr

[11] Patent Number: 5,893,917
[45] Date of Patent: Apr. 13, 1999

[54] MEMORY CONTROLLER AND METHOD OF CLOSING A PAGE OF SYSTEM MEMORY

[75] Inventor: Michael N. Derr, Folsom, Calif.

[73] Assignee: Intel Corporation, Santa Clara, Calif.

[21] Appl. No.: 08/724,171

[22] Filed: Sep. 30, 1996

[51] Int. Cl.[6] .................................................. G06F 13/16
[52] U.S. Cl. .................................. 711/105; 711/154
[58] Field of Search .............................. 711/105, 104, 711/154

[56] References Cited

U.S. PATENT DOCUMENTS

| | | | |
|---|---|---|---|
| 5,604,883 | 2/1997 | King et al. | 711/154 |
| 5,649,161 | 7/1997 | Andrade et al. | 711/167 |
| 5,664,153 | 9/1997 | Farrell | 711/154 |

Primary Examiner—Tod R. Swann
Assistant Examiner—Christopher S. Chow
Attorney, Agent, or Firm—Blakely, Sokoloff, Taylor & Zafman LLP

[57] ABSTRACT

A method and apparatus for performing a system memory read initiated by a bus master. In the prior art, a memory controller monitored activity on a system memory bus to determine whether to close a page of memory. Therefore, if a stall occurred during a burst read, the system memory bus would be idle and the page of system memory would be closed. The present invention keeps the page of system memory open during the entire burst read, even if the system memory bus becomes idle. Thus, latencies involved in opening and closing the page of system memory can be avoided. The present invention opens a page of system memory when receiving a first command, indicating the initiation of a read operation, from a bus master. The page of memory is kept open during the read operation, and is closed when a second command indicating the termination of the read operation is received from the bus master.

27 Claims, 6 Drawing Sheets

FIG. 6

MEMORY CONTROLLER AND METHOD OF CLOSING A PAGE OF SYSTEM MEMORY

FIELD OF THE INVENTION

The field of the invention relates to memory read operations in a computer system. More specifically, the invention relates to a method and apparatus for optimizing system memory performance during read operations.

BACKGROUND OF THE INVENTION

One type of prior computer system comprises a microprocessor connected to an external cache memory, a system memory, and various peripheral devices residing on a system bus. The microprocessor communicates with the cache memory, system memory, and peripherals through a chip that acts as a memory controller and a bridge to the system bus. The memory controller portion of the chip coordinates data transfers to and from these memory components at the request of the microprocessor or the peripheral devices.

Figure 1:
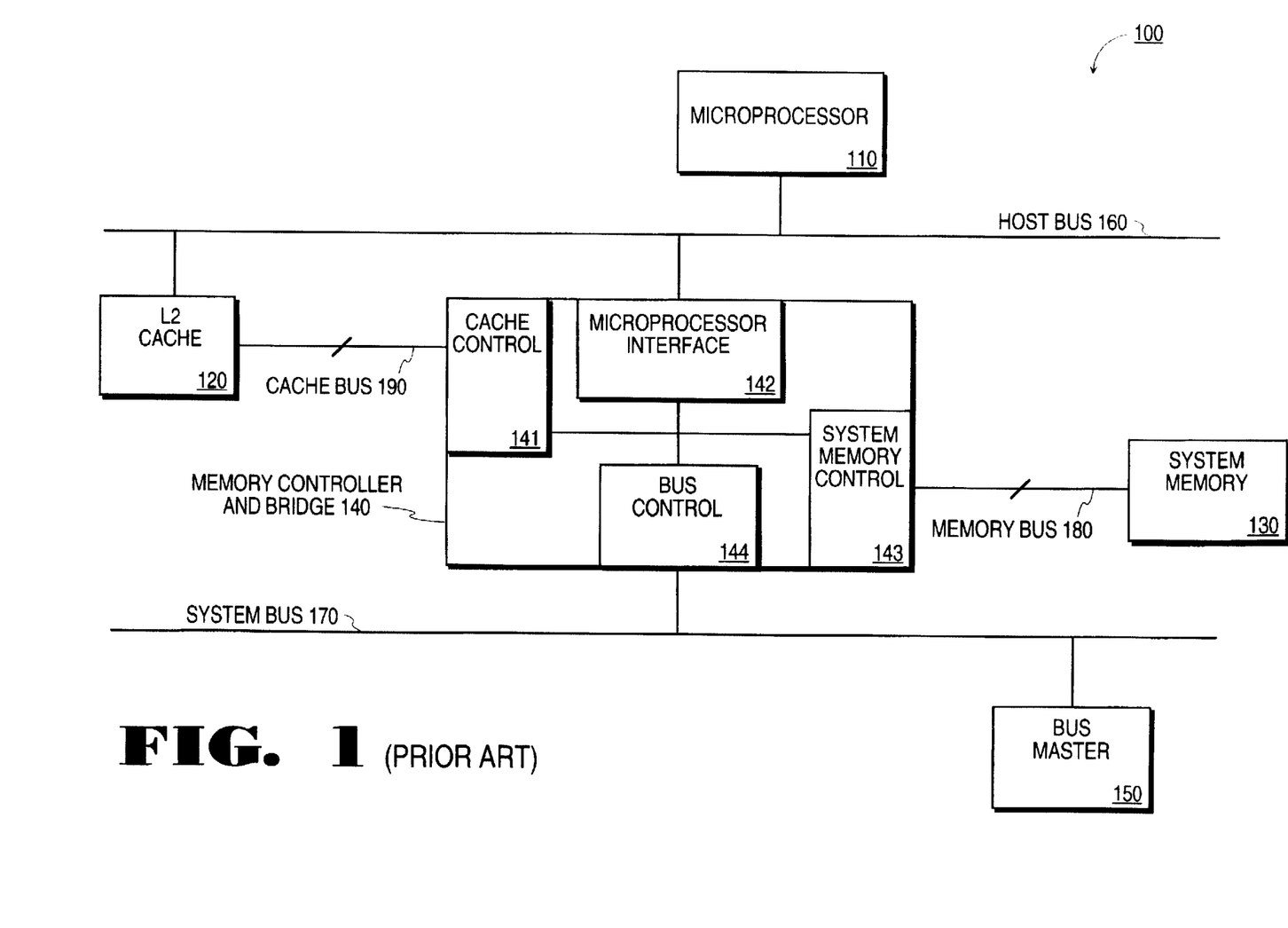
FIG. 1 illustrates a prior art computer system.

FIG. 1 illustrates a prior art computer system employing a memory controller chip. The microprocessor 110 is coupled to an external cache memory 120 and system memory 130 on a host bus 160. The host bus 160 is connected to a memory controller and bridge chip ("memory controller") 140. A second bus, system bus 170, is connected to the memory controller 140. The memory controller 140 functions as a bridge between microprocessor 110 and bus master 150. Bus master 150 represents a peripheral device that is coupled to the system bus 150. For example, bus master 150 may include devices such as a small computer system interconnect (SCSI) controller, a graphics accelerator, and add-in boards.

The memory controller 140 handles data transfer requests to and from both the microprocessor 110 and the bus master 150. The microprocessor 110 may access either the external cache memory 120 or the system memory 130. The bus master 150 may access the system memory device 130. The memory controller 140 receives a read or write request from either the microprocessor 110 or the bus master 150 and determines if one of the devices is the source or target. The microprocessor issues a read or write request using standard microprocessor timings and the bus master issues a read or write request as defined by the protocol rules for the system bus 170. For instance, the system bus 170 may employ the peripheral component interconnect (PCI) protocol, as described in the *PCI Local Bus Specification*, Rev. 2.1 (July 1995), available from the PCI Special Interest Group (SIG) in Hillsboro, Oreg.

One type of prior art memory controller 140 includes the following functional blocks: a microprocessor interface 142 for communicating with the microprocessor 110, a cache controller 141 for communicating with the external cache memory 120, a system memory controller 143 for communicating with the system memory 130, and a bus controller 144 for communicating with the system bus 170. These functional components of the memory controller are typically included within one integrated circuit chip. Alternatively, some manufacturers split the functions among more than one chip.

For a typical data read, the memory controller 140 receives read commands from the microprocessor 110 or the bus master 150. The memory controller 140 determines (1) the "source", i.e. the device containing the requested data, and (2) the address within the device at which the data is to be found. When the source is determined to be the system memory 130, the memory controller 140 asserts signals to control the data transfer on the memory bus 180.

Typically, the system memory 130 comprises dynamic random access memory (DRAM). For instance, the system memory 130 may comprise synchronous or asynchronous DRAM. Synchronous DRAMs improve system performance over asynchronous DRAMs, but are typically more expensive. Recently another type of DRAM has been used for computer system platforms. The extended data out (EDO) DRAM theoretically improves system performance at a relatively low cost in comparison to page mode DRAM devices.

Two signals on the memory bus 180 are used to enable the system memory 130 in preparation for a data read. The DRAM is therefore addressed in two stages. First a particular row is addressed, and then a column within the row. A row is accessed by latching an address on the memory bus 180 along with the row address strobe (RAS#) signal. Then, an address within the row is accessed by latching a column address on the memory bus 180 with a column address strobe (CAS#) signal. The row of memory that is accessed by the address latched on the RAS# assertion is often referred to as a "page" of memory. The page is considered open for as long as the RAS# signal is asserted. Depending upon the particular DRAM device used, the page may be of any size. For instance, a typical page may be 2 or 4 Kilobytes.

Computer systems often incur a big performance hit whenever accessing system memory. There is a latency in system memory access time due to assertion and deassertion of the RAS# signal. This is because every time the RAS# signal is asserted, it takes a certain number of clocks for the DRAM page to become available thereafter. Moreover, after the RAS# signal has been deasserted, the RAS# signal must be precharged for a predetermined amount of time before being asserted once again. Therefore, each time the RAS# signal is deasserted, a latency occurs before the RAS# signal may be reasserted.

One type of prior art memory controller attempts to decrease system memory access time by monitoring the activity on the memory bus 180 and correspondingly deasserting the RAS# signal when the memory bus 180 is inactive. Thus, the memory controller pro-actively starts the precharge for a later memory access. However, this method may cause a performance hit when the memory bus 180 becomes inactive in the midst of a burst memory read.

For instance, there are times when the memory bus 180 becomes idle because the system bus 170 is not receiving data fast enough. The memory bus is twice as fast as the system bus 170, since the memory bus is 64 bits wide and the system bus is 32 bits wide. Data must therefore be read from the system memory 130 and stored in a buffer within the memory controller 140. The memory controller 140 then dispatches the data from the buffer to the system bus 170. The memory bus 180 becomes idle when the buffer in the memory controller 140 is full. The page in system memory 130 is then closed in the middle of a read operation.

Another instance wherein the memory bus 180 becomes inactive is when a cache hit occurs and a writeback is performed. The memory controller 140 performs cache snoops in parallel with a read from system memory 130. An internal cache within the microprocessor 110 is snooped, and the external cache memory 120 is snooped. If the snoop determines that a writeback to system memory 130 is necessary, data is written to both the system memory 130 and the system bus 170. The writeback to system memory 130 may occur much faster than the writeback to the system bus 170, causing the memory bus 180 to become idle. The page in system memory 130 is once again closed in the middle of a read operation.

It is therefore desirable to provide a memory controller and method of performing system memory reads that will increase the performance of system memory read operations. It is further desirable to provide a method of keeping a memory page open during burst reads from a bus master. Moreover, it is desirable to provide a memory controller that determines whether to keep a page in system memory open based on activity on the system bus, rather than the memory bus.

SUMMARY OF THE INVENTION

A method and apparatus for performing a system memory read initiated by a bus master is described. The bus master initiates the read operation by asserting a first signal on a line of a system bus. The first signal is received by a memory controller and the memory controller correspondingly opens a page of system memory. The page of memory is kept open during the duration of the read operation from that page of memory. The bus master terminates the read operation by asserting a second signal on a line of the system bus. When the memory controller detects the second signal, it closes the page of system memory.

BRIEF DESCRIPTION OF THE DRAWINGS

The present invention is illustrated by way of example and not limitation in the accompanying figures and in which.

DETAILED DESCRIPTION

A memory controller and method of accessing a page of system memory is described. In the following description, numerous specific details are set forth, such as specific signal protocols, timing diagrams, and integrated circuit devices, in order to provide a thorough understanding of the present invention. It will be apparent, however, to one skilled in the art that these specific details need not be employed to practice the present invention. In other instances, well-known circuitry or signals have not been described in detail in order to avoid obscuring the present invention.

In the following description, a method of performing a system memory burst read, initiated by a bus master (e.g., a microprocessor), is described. A memory controller opens a page of system memory at the initiation of the burst read by the bus master. The memory controller closes the page of system memory upon the termination of the burst read by the bus master. For one embodiment of the invention, the burst read is initiated by asserting a cycle frame signal on a line of a system bus and terminated by deasserting the cycle frame signal. The page of memory is therefore open while the cycle frame signal is asserted and closed when the cycle frame signal is deasserted.

The memory controller of the present invention interfaces a PCI bus and a system memory. The system memory comprises one of several well-known dynamic random access memory (DRAM) devices. The system bus 170 need not operate according to the PCI protocol. The system bus may operate according to another well-known system bus protocol such as the industry standard architecture (ISA) bus or the extended ISA (EISA) bus.

Figure 2:
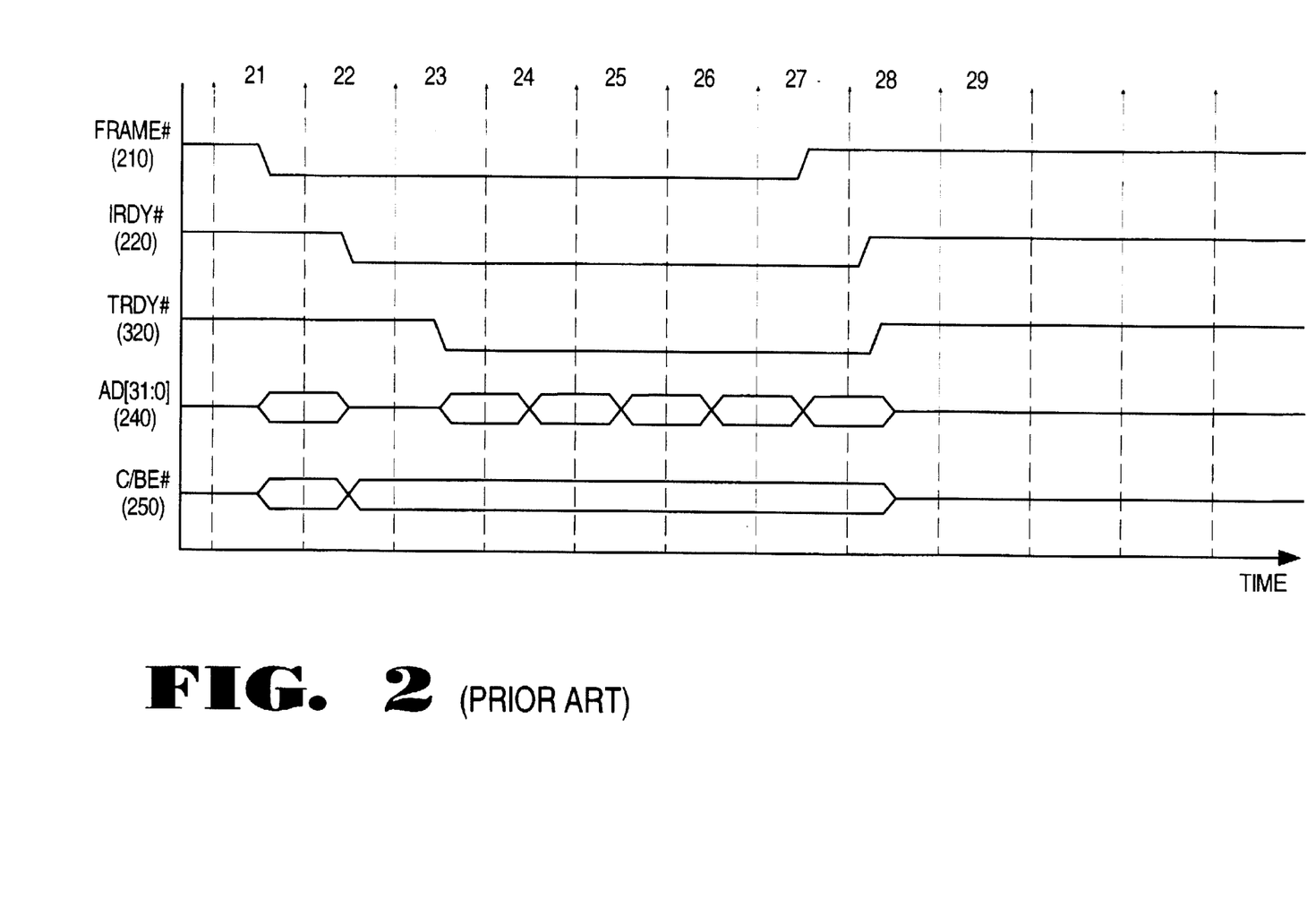
FIG. 2 illustrates a signal timing diagram of a prior art PCI burst memory read.

FIG. 2 illustrates a timing diagram of a prior art read request from system memory 130 initiated by bus master 150, both of FIG. 1. For the embodiment illustrated in FIG. 2, the system bus 170 comprises a 33 MHz synchronous bus, operating according to the PCI protocol. Moreover, the PCI bus is able to transfer one double word (DWORD) of data, or 32 bits, at any one time.

Data transfers occur over the PCI bus in "burst transfers," wherein the burst comprises an address phase and one or more data phases. The burst typically comprises a number of data accesses to the same page of memory in the DRAM. Bursts are especially common in multimedia applications, such as those comprising native signal processing (NSP) routines.

The FRAME# signal on line 210 is asserted by the bus master 150 in clock 21 to command the start of a transaction on the system bus 170. The "#" symbol after the signal name designates that the signal is active low. Thus, the signal is "asserted" when low (logical 0), and "deasserted" when high (logical 1).

During the same clock 21, the bus master 150 asserts bus command type signals on the C/BE# lines 250 and address signals on the AD[31:0] lines 240. The C/BE# lines 250 represent the bus command ("C") and byte enables ("BE"). During the address phase, such as in clock 21, the C/BE# lines 250 act as bus command. During the data phase, the C/BE# lines 250 act as byte enables. In one embodiment, the C/BE# lines 250 are four bits wide and are driven with a "Memory Read" command type (0110) during clock 21.

The memory controller 140 receives the FRAME# signal on line 210, address signals on lines 240, and command type signals on lines 250. The command type is decoded by the memory controller to determine 10 the appropriate source device. For the memory read command, the memory controller 140 enables the system memory 130 for a read, as described in detail herein below.

Clock 22 is a turnaround clock, in which the bus master 150 asserts the initiator ready signal, IRDY# on line 220. The assertion of IRDY# indicates that the bus master 150 is able to start the data phase of the transaction and therefore is prepared to accept data from the system memory 130. The bus master 150 stops driving the AD[31:0] lines 240 during this clock.

In clock 23, the target ready signal, TRDY# on line 230, is asserted by the memory controller 140. This step starts the beginning of the data phase. The assertion of TRDY# indicates that the target, i.e. the system memory 130, has provided requested data to the memory controller 140, and the memory controller 140 has presented the data on AD[31:0] lines 240.

Thereafter, valid data is presented on AD[31:0] lines 240 in clocks 24–27. This is referred to as the data phase of the bus transaction, in which data words are read from system memory 130 to the bus master 150. The bus master 150 commands the end of the data phase by deasserting the FRAME# signal on line 210 in clock 27. The IRDY# and TRDY# signals on lines 220 and 230 are then deasserted in clock 28. This method of performing a memory read with the PCI protocol is described in detail in the *PCI Local Bus Specification*, Rev. 2.1 (July 1995), available from the at PCI Special Interest Group (SIG) in Hillsboro, Oreg.

Figure 3:
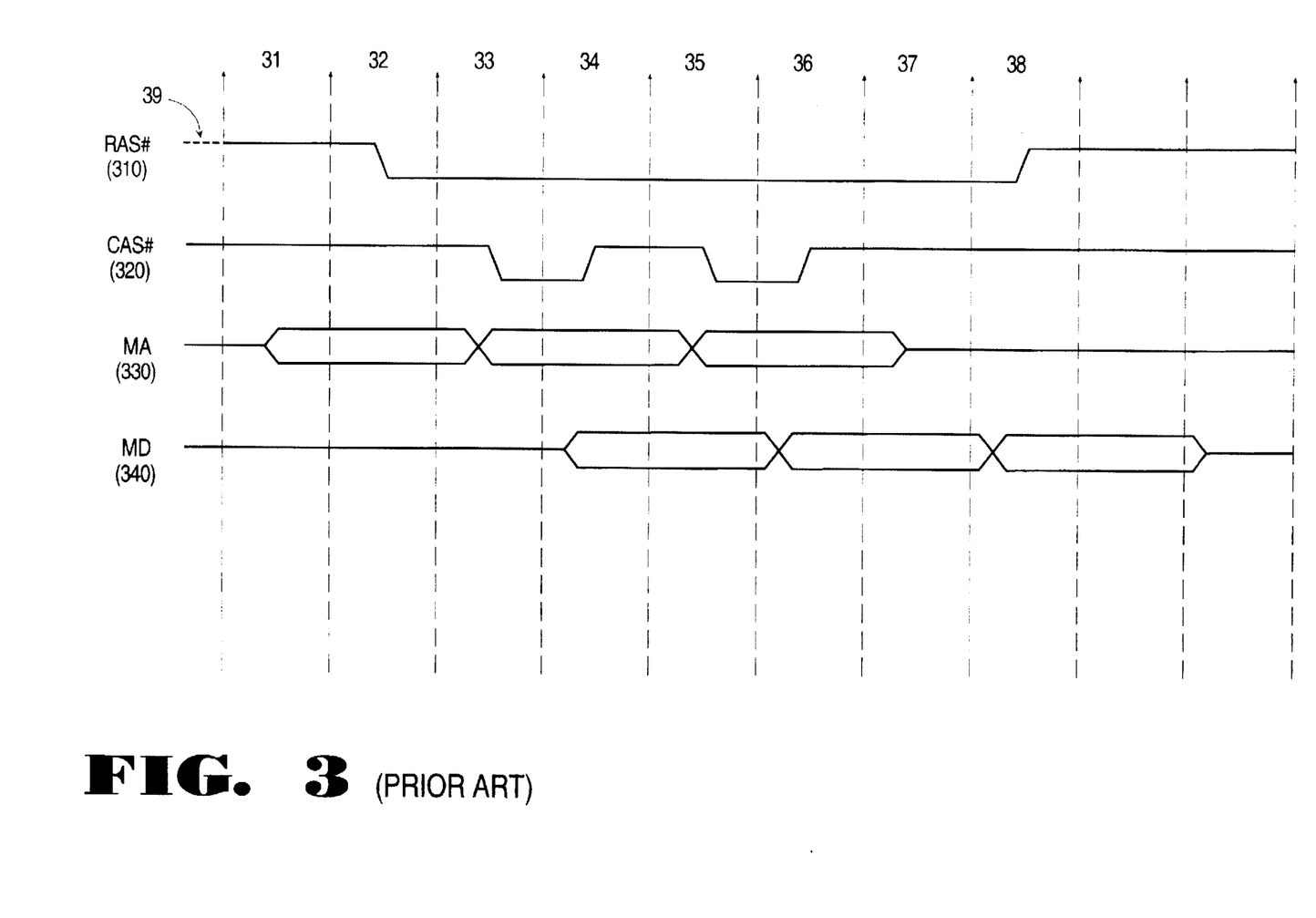
FIG. 3 illustrates a signal timing diagram of a prior art system memory read cycle.

FIG. 3 illustrates a timing diagram of signals on the memory bus 180 during a system memory read. Referring to FIG. 3, in clock 31, an address is asserted on the MA lines 330 by the memory controller 140. The address indicates which page is to be accessed within system memory 130. The address is driven first in clock 31, and then it is latched to the system memory 130 by the assertion of the RAS# signal on line 310 in clock 32. The RAS# signal on line 310 is asserted by the memory controller 140 to signal the start of a memory read. The RAS# signal on line 310 is typically asserted by the memory controller 140 upon detection of a request for a transaction with system memory 130. Recall that the system memory read is requested by asserting the FRAME# signal, driving the memory address on AD[31:0] lines, and driving the system memory read type on C/BE# lines. The memory controller 140 decodes these signals, and if it is determined that the bus master 150 has requested a read operation and the system memory 130 is the target device, then the RAS# signal on line 310 is asserted.

As mentioned previously, the RAS# signal on line 310 may only be asserted after it has been precharged for a predetermined amount of time. This precharge time is dependent upon the specification for the particular DRAM used in implementing system memory 130. If the RAS# signal on line 310 was asserted prior to clock 31, then an amount of time greater than or equal to the precharge time must pass before the RAS# signal on line 310 can be asserted once again. In one embodiment, the precharge time is equal to three clocks, and therefore the RAS# signal on line 310 must be deasserted for at least 3 clocks before being asserted in clock 32. Dashed line 39 illustrates that the RAS# signal on line 310 may have been deasserted for some amount of time previous to clock 31, in order to satisfy precharge requirements.

In clock 33, an address is presented on the MA lines 330. This address is used to select a column within the system memory 130. The address is latched into the memory 130 by assertion of the column address strobe CAS# signal on line 320 by the memory controller 140.

The data then appears on the data bus MD 340 in clock 34. It can therefore be appreciated from the timing diagram that it takes a three clock latency—from asserting the page address on MA 330 in clock 31 to the appearance of valid data on MD 340 in clock 34—to do an initial data access to a page. Thereafter, the CAS# signal 320 is asserted in clock 35, along with another column address on MA 330. Valid data is presented on MD 340 in the next clock 36. It therefore takes two clocks to access each address within the same DRAM page once the page is open.

In clock 38, the RAS# signal on line 310 is deasserted, indicating that the page is to be closed. This typically occurs either because the read request from the bus master 150 has "run into" the next page of DRAM, and therefore the RAS# signal on line 310 must be deasserted for this page and reasserted for the next, or because the read request has it completed in the DRAM. In either case, when the memory controller 140 deasserts the RAS# signal on line 310, the page of memory closes.

As was mentioned previously, when the page closes there is a latency involved before the system memory 130 can be accessed again. This latency is dependent upon the precharge specifications of the particular memory device 130.

When a burst read is requested by bus master 150, often a lot of data is requested from the same page of memory 130. Especially with multimedia applications, large blocks of data are stored in one location that may be requested by the multimedia bus master 150. This is therefore the ideal situation in which the memory controller 140 can keep the page of system memory open during the entire read request that may involve many DRAM read cycles. A method and apparatus for keeping a page of system memory open during a burst read to that page is described herein below.

Figure 4:
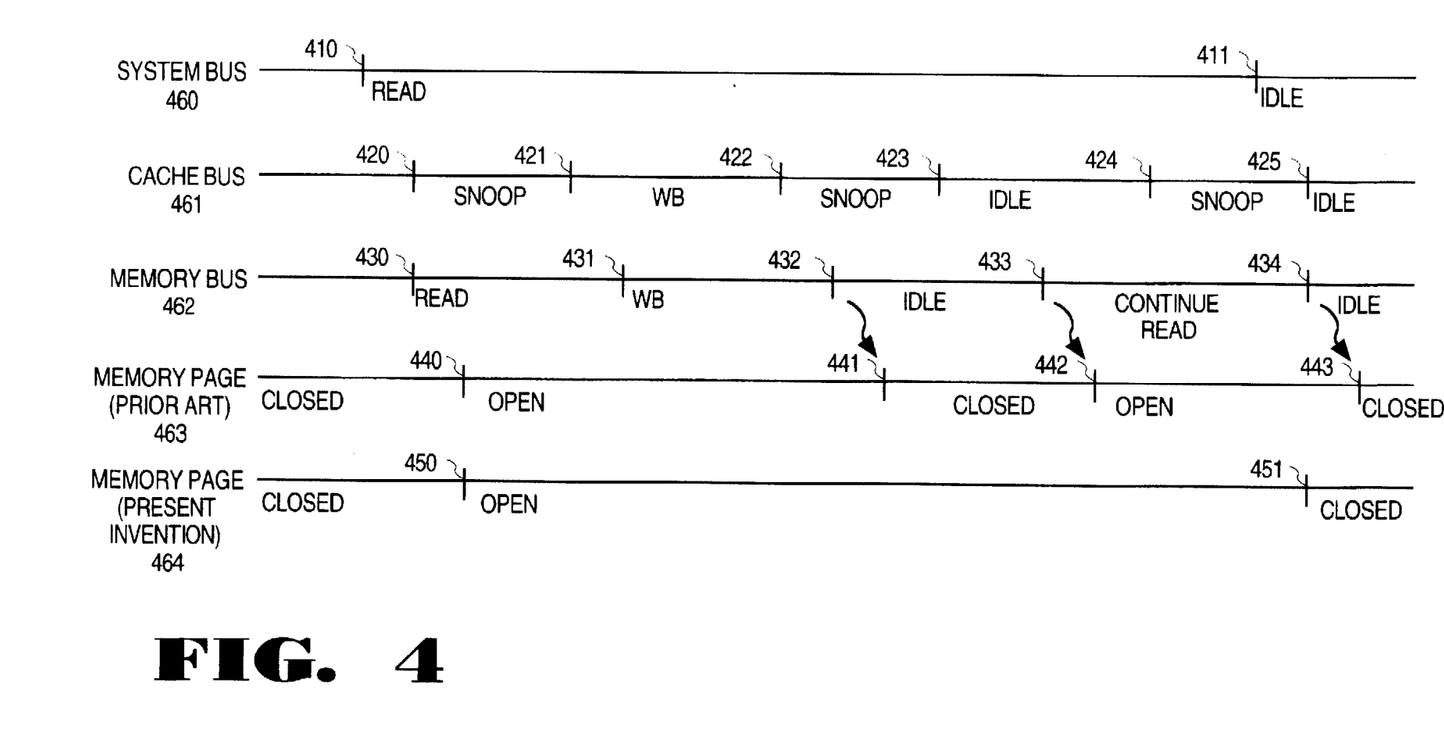
FIG. 4 illustrates a time line of a burst memory read in accordance with one embodiment of the present invention.

FIG. 4 illustrates a series of time lines, indicating the operation of each device within the computer system 100. The two time lines 463 and 464 show the status of the memory page in the prior art (463) and in accordance with the present invention (464).

The bus master 150 first initiates a read on the system bus 170 by asserting the FRAME# signal at point 410. The read request is received by the memory controller 140. The memory controller 140 then performs two functions in parallel. At point 420, a cache is snooped, as can be seen on cache memory bus 190. The external cache memory 120 and a cache memory internal to microprocessor 110 both must be snooped to see if the requested data resides therein. Point 420 illustrates the snooping of one of the two cache memories. Concurrently the memory controller 140 starts the read on the memory bus 180 by asserting the RAS# signal at point 430.

Within the prior art, the RAS# signal is asserted and deasserted by the memory controller 140 based upon an internally-generated signal that is in part dependent upon the bus activity on the memory bus 180. By contrast, the method of the present invention examines the activity on the system bus 170 to determine when to assert and deassert the RAS# signal.

Upon assertion of the RAS# signal on a line of the memory bus at point 430, the memory page is opened at points 440 and 450 in both the prior art and the present invention.

Assume that the result of the first cache snoop at point 420 is that the data is found within the cache memory. If the cache memories comprise write-back cache memories, the data is written back to the system memory 130 if the hit to the cache memory is found to be modified.

In FIG. 4, the data is found to be modified, and the writeback is seen on the cache memory bus 190 at point 421. For one embodiment of the invention, the data is written back to the system memory 130 in parallel with writing the data to the bus master 150 on the system bus 170.

The memory controller 140 performs the writeback to system memory 130 by temporarily suspending the burst read. At point 431 the data is written back to the memory 130 on the memory bus 180.

In one embodiment, the data is also written to the bus master 150 in parallel with the writeback to memory. Thus, the data from the cache memory is delivered on the system bus 170 as part of the burst read. Alternatively, the data may be written back to the system memory 130 first and then read from system memory 130 as part of the burst read cycle.

Once the writeback is completed, the memory controller 140 performs the snoop of the second cache memory at point 422. Note that while this snoop is occurring, the read on the memory bus 180 has not resumed. Thus the memory bus 180 is idle as shown at point 432.

In the prior art memory controller the memory bus 180 activity is monitored to determine whether to assert the RAS# signal to keep the page open. Thus when the memory bus 180 is idle at point 432, the memory page is closed by deasserting the RAS# signal at point 441. It can be appreciated that this is not the most efficient way to perform a burst read, since the bus master 150 is in the middle of its read cycle and therefore will be accessing the system memory 130 soon.

In order to take advantage of this knowledge, the present invention (timeline 464) uses the FRAME# signal on a line of the system bus 170, rather than signals on lines of the memory bus 180, to determine whether or not to keep the page open. The page is kept open during the time that the FRAME# signal is asserted. As was discussed in conjunction with FIG. 2, in the prior art the FRAME# signal is asserted throughout the entire burst read. The page will therefore remain open during the entire read operation, even when the memory bus 180 is idle.

The second snoop of FIG. 4 is a cache miss, so that no writeback cycle is required. The burst read is therefore continued, as is seen at point 433 on the memory bus 180. A cache snoop is performed in parallel at point 424 on the cache bus 190. In the prior art, the memory page is then opened again at point 442.

Recall that the memory page can only be opened once the RAS# signal has been deasserted for at least the precharge time. Therefore the page cannot be opened at point 442 until this amount of time has passed. Moreover, recall that when the memory page is opened by asserting the RAS# signal, it takes at least a three lock latency before valid data is delivered to the system bus 170 from the system memory 130. Thus, in the prior art memory controller 140, there is a latency every time the memory page is closed in the middle of a burst read.

The burst read continues until the bus master 150 signals the end of the read transaction at point 411 on the system bus. For one embodiment this is accomplished by deasserting the FRAME# signal. At this point, the cache bus 190 and memory bus 180 are returned to idle, as illustrated at points 425 and 434.

In the prior art, the memory controller 140 detects that the memory bus 180 is idle and therefore closes the memory page by deasserting the RAS# signal on line 130 in response thereto at point 443. In the present invention, the memory controller 140 detects that the FRAME# signal as was deasserted by the bus master 150 at point 411 and therefore closes the memory page at point 451.

Figure 5:
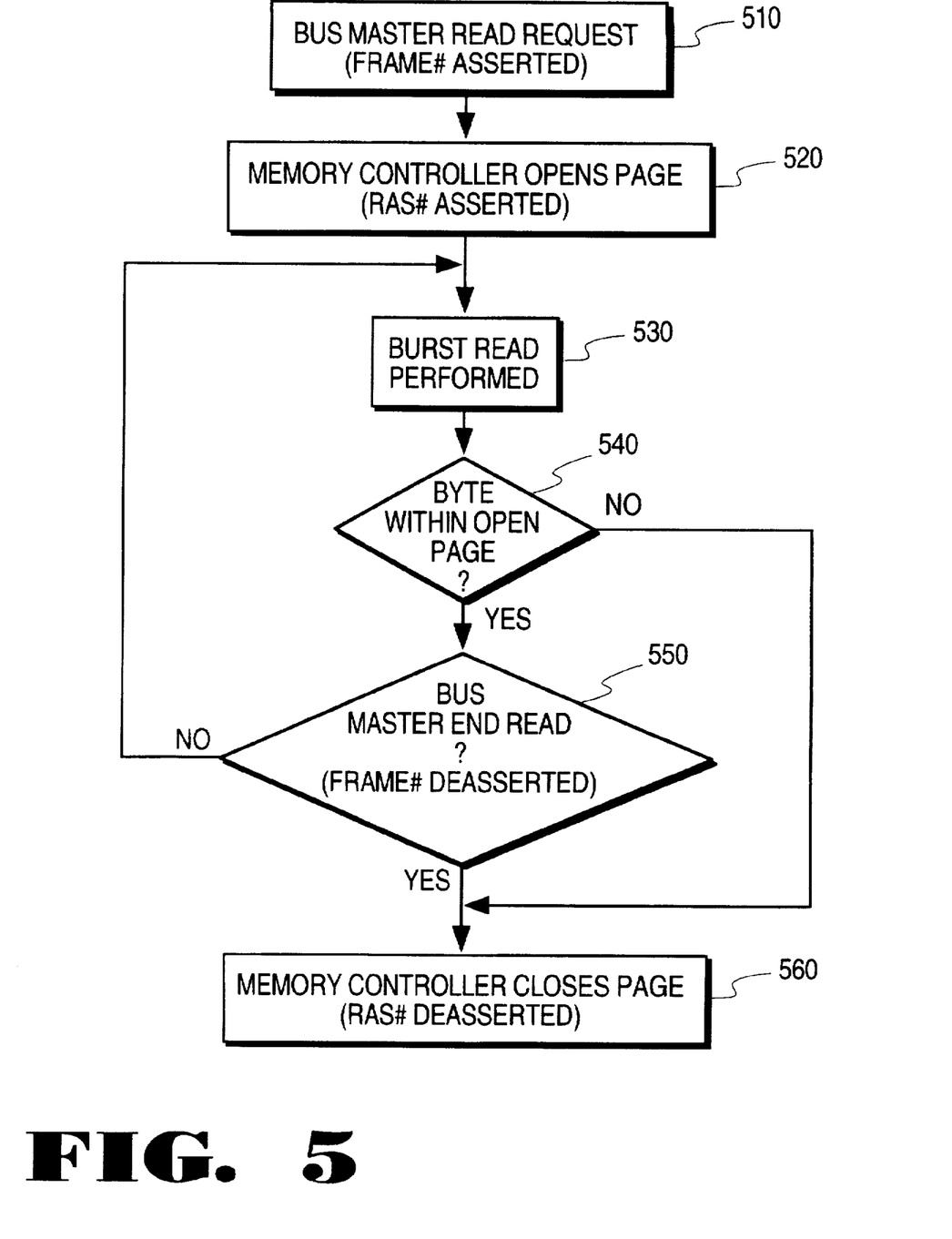
FIG. 5 illustrates a process flow diagram of one embodiment of the present invention.

FIG. 5 illustrates a process flow diagram of one embodiment of the present invention. The bus master 150 requests a read from system memory 130 at step 510. The FRAME# signal is therefore asserted on a line of the system bus.

The memory controller 140 detects the assertion of the FRAME# signal, and thereafter asserts the RAS# signal at step 520. The assertion of the RAS# signal opens a page of system memory 130.

The burst read is then performed, illustrated as step 530. During the burst read of step 530, any number of events may occur. For instance, a cache hit may occur, causing a writeback of data to system memory 130 and to the bus master 150. The RAS# signal is continuously asserted, and thus a page of system memory 130 is held open, during these events.

It is possible that a burst read may encompass some read data residing within one page of system memory 130 and some in another page. This scenario is illustrated as step 540. In this case, the data is read from a first page, and then the page is closed by deasserting the RAS# signal. Thereafter the next page is opened by reasserting the RAS# signal (once the precharge time has been satisfied) with a new row address on the memory bus 180.

The bus master then ends the read transaction by deasserting the FRAME# signal at step 550. The memory controller 140 detects the deassertion of the FRAME# signal and correspondingly closes the current page of system memory 130 by deasserting the RAS# signal in step 560.

From FIG. 5, it can be appreciated that for one embodiment the memory page is closed in response to two situations. The first situation where the RAS# signal is deasserted occurs when bus master 150 signals the end of a read transaction by the deasserting the FRAME# signal. The other situation occurs when some of the burst read data resides in more than one page of system memory 130.

The present invention is advantageous in that the RAS# signal for the currently-open page generally follows the assertion and deassertion of the FRAME# signal on the system bus 170. This allows the currently-active page of memory to stay open during an entire burst read operation directed to that page.

Figure 6:
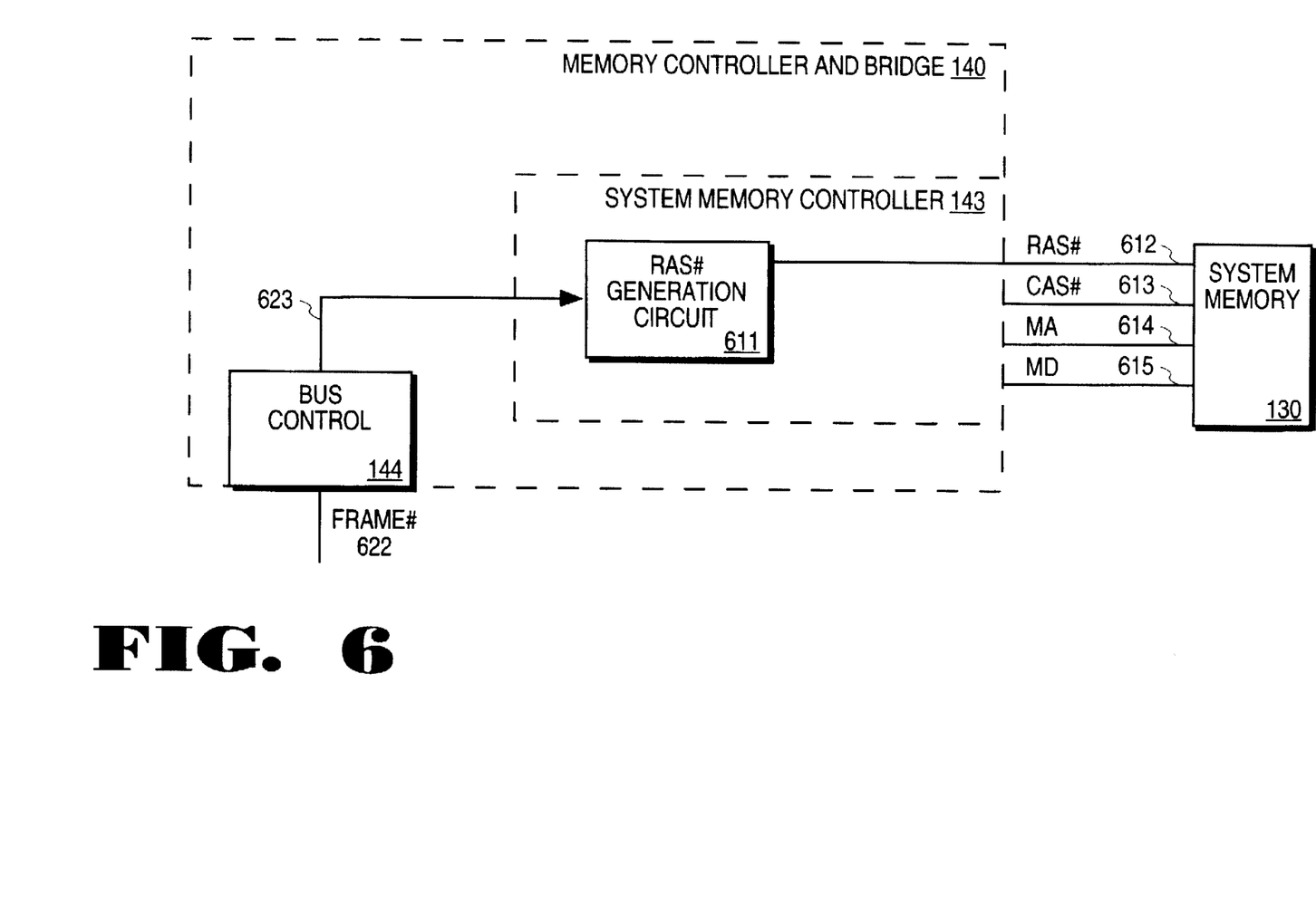
FIG. 6 illustrates a block diagram of one embodiment of a memory controller in accordance with the present invention.

FIG. 6 illustrates a block diagram of the RAS# generation circuitry, residing within the system memory control circuitry 143 of the memory controller 140. The memory controller 140 is coupled to the system memory 130 by the RAS# signal on line 612, the CAS# signal on line 613, the memory address bus MA 614, and the memory data bus MD 615. It should be appreciated that other signals may also be used to couple the memory controller 140 and the system memory 130, without departing from the scope of the present invention.

Recall that bus controller 144 interfaces with the system bus 170. The bus controller 144 detects an assertion of the FRAME# signal on line 622 and correspondingly asserts a signal on line 623, which is an input signal to the RAS# generation circuit 611. The RAS# generation circuitry detects the assertion of an input signal on line 623 and correspondingly asserts the RAS# signal on line 612. The RAS# signal is then delivered to the system memory 130.

For one embodiment, the RAS# generation circuit 611 further contains logic to determine when a data word of the current burst read resides within another page. For this alternate embodiment, RAS# generation circuit 611 closes the page of memory by deasserting the RAS# signal on line 612. The RAS# signal on line 612 is then reasserted to open a new page of memory and to continue the burst read operation.

When the FRAME# signal is deasserted on line 622, the bus control circuit 144 detects the deassertion and correspondingly signals this event to the RAS# generation circuit 611 on line 623. It should be appreciated by one skilled in the art that the signal on line 623 may be implemented as a combination of one or more signals. It is merely essential that the bus control circuit 144 include some means by which to communicate the state of the FRAME# signal to the RAS# generation circuit 611.

The RAS# generation circuit 611 detects that the signal on line 623 has been deasserted, and closes the page of system memory 130 by deasserting the RAS# signal on line 612.

Thus it can be appreciated from the above description that the method and apparatus of the present invention, wherein the memory page of system memory 130 is opened and closed according to the state of the FRAME# signal on line 622, eliminates undesired latencies in burst reads from bus master 150.

The described method is performed by a memory controller for interfacing between a microprocessor and (1) an external cache, (2) system memory, and (3) a system bus. Alternatively, the method of the present invention may be performed in a microprocessor computer system lacking one or more of the above-described devices. Moreover, the present invention may be employed in a computer system employing more than one microprocessor, more than one system memory device, more than one bus master on the system bus, or more than one external cache.

In the foregoing detailed description a memory controller and method of performing system memory reads is described. The memory controller and method of the present invention has been described with reference to specific bus protocols, signal timings, cache structures, and system memory devices. It will be appreciated, however, that various changes and modifications may be made thereof without departing from the scope of the invention. For instance, the system bus 170 may be implemented with differing widths and bus speeds. The signals described herein as active low or active high may be of the opposite designation. Moreover, a write-through cache may be implemented in place of a write-back cache. The particular bus characteristics, signals, and devices used in the computer system should not be used to limit the scope of the present invention. The specification and drawings are, accordingly, to be regarded in an illustrative rather than a restrictive sense.

What is claimed is:

1. A method of performing a read operation from a page of memory, said method comprising:

opening said page of memory in response to a first signal from a bus master coupled to a bus, said first signal indicating initiation of said read operation; and closing said page of memory in response to a second signal from said bus master, the second signal indicating termination of said read operation without indicating initiation of a subsequent operation to access said memory.

2. The method of claim 1 wherein opening said page of memory in response to a first signal from a bus master comprises opening said page of memory in response to an assertion of a cycle frame signal by said bus master and wherein closing said page of memory in response to a second signal from said bus master comprises closing said page of memory in response to a deassertion of said cycle frame signal by said bus master.

3. The method of claim 1 wherein opening said page of memory comprises asserting a row address strobe signal to said memory and wherein closing said page of memory comprises deasserting said row address strobe signal to said memory.

4. The method of claim 1 wherein said memory comprises dynamic random access memory (DRAM).

5. The method of claim 1 wherein said bus comprises a peripheral component interconnect (PCI) bus.

6. The method of claim 1 wherein opening said page of memory comprises:

asserting a row address to said memory, the row address corresponding to said page of memory; and asserting a memory read command to said memory to read data from said page of memory.

7. A method of reading data from system memory in a computer system, comprising the steps of:

(A) initiating a system memory read request by asserting a cycle frame signal on a first bus;

(B) detecting assertion of said cycle frame signal and correspondingly enabling a page of a system memory; and (C) disabling said page of said system memory upon detecting a deassertion of said cycle frame signal on said first bus.

8. The method of claim 7, wherein step (B) further comprises the step of asserting a row address strobe signal and step (C) further comprises the step of deasserting said row address strobe signal.

9. The method of claim 7, wherein said system memory further comprises dynamic random access memory (DRAM).

10. The method of claim 7, wherein said first bus comprises a peripheral component interconnect (PCI) bus.

11. The method of claim 7, wherein step (A) further includes the steps of asserting a first address corresponding to said page of said system memory on said first bus; and asserting a first system memory read command on said first bus.

12. A method of performing a burst read operation, said burst read including a plurality of read operations, from a system memory in a computer system, said method comprising the steps of:

(A) initiating said burst read operation by asserting a cycle frame signal on a system bus;

(B) correspondingly enabling a first page of system memory by asserting a row address strobe signal on a memory bus;

(C) continuing to assert said row address strobe signal during said burst read so long as said cycle frame signal is asserted and so long as each of said plurality of read operations corresponds to an address within said first page of system memory.

13. The method of claim 12, wherein step (C) further comprises the step of deasserting said row address strobe signal if said cycle frame signal is deasserted or one of said plurality of read operations corresponds to an address outside of said first page of system memory.

14. The method of claim 12, wherein said system memory further comprises dynamic random access memory (DRAM).

15. The method of claim 12, wherein said system bus comprises a peripheral component interconnect (PCI) bus.

16. The method of claim 12, wherein step (A) further includes the steps of asserting a row address corresponding to said page of said system memory on said system bus; and asserting a first system memory read command on said system bus.

17. The method of claim 12, wherein continuing said burst read in step (C) further comprises the steps of (C1) asserting a column address on said memory bus; and (C2) asserting a column address strobe on said memory bus.

18. A controller comprising:

a control circuit for asserting interface signals to a system memory, said control circuit including circuitry that opens a page of said system memory in response to a command that indicates initiation of a memory access operation and that closes said page of said system memory in response to a first signal from a bus master that indicates termination of said memory access operation without indicating initiation of a subsequent memory access operation.

19. The memory controller of clam 18, wherein said system memory comprises dynamic random access memory (DRAM).

20. The memory controller of claim 18, wherein said system bus comprises a peripheral component interconnect (PCI) bus.

21. The memory controller of claim 18, wherein said command comprises an assertion of a cycle frame signal and said first signal comprises a deassertion of said cycle frame signal.

22. A computer system comprising:

a system memory;

a system bus;

a bus master coupled to said system bus that initiates a read request from said system memory, said read request comprising a first command indicating initiation of said read request and a second command indicating termination of said read request; and a memory controller coupled to said system memory and said system bus, said memory controller including,
a control circuit including
circuitry that opens a page of said system memory in response to a command from said bus master that indicates initiation of a memory access operation and that closes said page of said system memory in response to a first signal from said bus master that indicates termination of said memory access operation without indicating initiation of a subsequent memory access operation.

23. The memory controller of claim 22, wherein said system memory comprises dynamic random access memory (DRAM).

24. The memory controller of claim 22, wherein said system bus comprises a peripheral component interconnect (PCI) bus.

25. The memory controller of claim 22, wherein said command comprises an assertion of a cycle frame signal and said indication comprises a deassertion of said cycle first signal.

26. A memory controller, comprising:

a bus control circuit for receiving a first command and a second command from a bus master on a system bus, wherein said first command indicates an initiation of a read bus cycle and said second command indicates the termination of a read bus cycle without indicating initiation of a subsequent memory access operation; and a memory control circuit for generating interface signals with a system memory, said memory control circuit including means for opening a page of said system memory upon indication from said bus control circuit that said first command has been received, and closing said page of system memory upon indication from said bus control circuit that said second command has been received.

27. A computer system, comprising:

a system memory;

a system bus;

bus master coupled to said system bus that initiates a read request from system memory, said read request comprising a first command indicating the initiation of said read request and a second command indicating a termination of said read request without indicating initiation of a subsequent memory access operation; and memory controller coupled to said system memory and said system bus, said memory controller including,
a bus control circuit for receiving said first command and said second command from said bus master on said system bus; and
a memory control circuit for generating interface signals with said system memory, said memory control circuit including
means for opening a page of said system memory upon indication from said bus control circuit that said first command has been received, and closing said page of system memory upon indication from said bus control circuit that said second command has been received.

* * * * *

UNITED STATES PATENT AND TRADEMARK OFFICE
CERTIFICATE OF CORRECTION

PATENT NO. : 5,893,917  
DATED : April 13, 1999  
INVENTOR(S) : Derr

It is certified that error appears in the above-identified patent and that said Letters Patent is hereby corrected as shown below:

Column 4,  
Line 42, delete "10".

Column 5,  
Line 58, delete "it".

Column 7,  
Line 41, delete "as".

Column 11,  
Line 33, delete "first" and insert -- frame --.  
Line 33, delete "indication" and insert -- first signal --.

Signed and Sealed this

Twentieth Day of January, 2004

JON W. DUDAS  
*Acting Director of the United States Patent and Trademark Office*